US008307639B2

(12) United States Patent
Nishioka et al.

(10) Patent No.: US 8,307,639 B2
(45) Date of Patent: Nov. 13, 2012

(54) EXHAUST PURIFICATION DEVICE OF INTERNAL COMBUSTION ENGINE

(75) Inventors: Hiromasa Nishioka, Susono (JP); Shinya Hirota, Susono (JP); Kotaro Hayashi, Mishima (JP); Takamitsu Asanuma, Mishima (JP); Kohei Yoshida, Gotenba (JP); Hiroshi Otsuki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 921 days.

(21) Appl. No.: 12/308,768

(22) PCT Filed: Jan. 29, 2008

(86) PCT No.: PCT/JP2008/051705
§ 371 (c)(1),
(2), (4) Date: Dec. 23, 2008

(87) PCT Pub. No.: WO2008/096687
PCT Pub. Date: Aug. 14, 2008

(65) Prior Publication Data
US 2009/0308053 A1     Dec. 17, 2009

(30) Foreign Application Priority Data

Feb. 6, 2007  (JP) ................. 2007-026637

(51) Int. Cl.
*F01N 3/10* (2006.01)
(52) U.S. Cl. ............... 60/301; 60/286; 60/295; 60/297; 60/311
(58) Field of Classification Search ............ 60/295, 60/286, 297, 311, 301
See application file for complete search history.

(56) References Cited

U.S. PATENT DOCUMENTS

| 5,551,231 | A  | * | 9/1996 | Tanaka et al. ............. 60/289 |
| 6,502,391 | B1 | * | 1/2003 | Hirota et al. ............. 60/288 |
| 2002/0015669 | A1 | * | 2/2002 | Hashimoto ............. 422/171 |
| 2002/0058004 | A1 | | 5/2002 | Bartley et al. |
| 2004/0103650 | A1 | * | 6/2004 | Miyashita ............. 60/285 |
| 2005/0060987 | A1 | * | 3/2005 | Nakano et al. ............. 60/285 |
| 2006/0053772 | A1 | * | 3/2006 | Dou et al. ............. 60/285 |
| 2006/0064969 | A1 | | 3/2006 | Yoshida et al. |
| 2009/0077948 | A1 | * | 3/2009 | Mondori et al. ............. 60/285 |

FOREIGN PATENT DOCUMENTS

| JP | A-2000-300995 | 10/2000 |
| JP | A-2005-133610 | 5/2005 |
| JP | A-2006-291866 | 10/2006 |
| WO | WO 01/056686 A1 | 8/2001 |
| WO | WO 2005040571 A1 * | 5/2005 |
| WO | WO 2006/073199 A1 | 7/2006 |

OTHER PUBLICATIONS

Supplemental European Search Report issued in Application No. 08704384.0; Dated Jan. 17, 2011.

* cited by examiner

*Primary Examiner* — Binh Q Tran
*Assistant Examiner* — Matthew T Largi
(74) *Attorney, Agent, or Firm* — Oliff & Berridge, PLC

(57) ABSTRACT

An $SO_x$ trap catalyst able to trap $SO_x$ contained in the exhaust gas is arranged in an engine exhaust passage upstream of an $NO_x$ storing catalyst in an internal combustion engine. When the $SO_x$ trap rate of the $SO_x$ trap catalyst falls, fuel is added in the exhaust gas flowing into the $SO_x$ trap catalyst to form in the $SO_x$ trap catalyst a region in which an air-fuel ratio becomes locally rich. $SO_x$ released from the $SO_x$ trap catalyst in this region can be trapped in the $SO_x$ trap catalyst at the downstream side once again without flowing out from the downstream end of the $SO_x$ trap catalyst.

7 Claims, 14 Drawing Sheets

(A)

(B)

(A)

(B)

(A)

(B)

(C)

(A)

(B)

(A)

(B)

(A)

(B)

(A)

(B)

EXHAUST PURIFICATION DEVICE OF INTERNAL COMBUSTION ENGINE

TECHNICAL FIELD

The present invention relates to an exhaust purification device of an internal combustion engine.

BACKGROUND ART

The fuel and lubrication oil used in an internal combustion engine contain sulfur, therefore the exhaust gas contains $SO_x$. In this regard, this $SO_x$ acts to greatly lower the performance or durability of the exhaust gas purification catalyst or other post-treatment device arranged in an engine exhaust passage, therefore the $SO_x$ in the exhaust gas is preferably removed.

Therefore, there is known an internal combustion engine in which an $SO_x$ trap catalyst able to trap the $SO_x$ contained in the exhaust gas is arranged in an engine exhaust passage (see Japanese Patent Publication (A) No. 2005-133610). This $SO_x$ trap catalyst has a property of trapping the $SO_x$ contained in the exhaust gas when the air-fuel ratio of the exhaust gas flowing into the $SO_x$ trap catalyst is lean and allowing the trapped $SO_x$ to gradually diffuse inside the $SO_x$ trap catalyst when the temperature of the $SO_x$ trap catalyst rises under a lean air-fuel ratio of the exhaust gas and as a result allowing the $SO_x$ trap rate to be restored. Therefore, this internal combustion engine is provided with estimating means for estimating the $SO_x$ trap rate of the $SO_x$ trap catalyst and, when the $SO_x$ trap rate falls below a predetermined rate, the temperature of the $SO_x$ trap catalyst is raised under a lean air-fuel ratio of the exhaust gas to thereby restore the $SO_x$ trap rate.

In this regard, in this $SO_x$ trap catalyst, the $SO_x$ is trapped and deposits in order from the upstream side, therefore the $SO_x$ trapping ability will fall in order from the upstream-side. In this regard, in this $SO_x$ trap catalyst, if the $SO_x$ trapping ability at the upstream side falls, even if there is a sufficient $SO_x$ trapping ability at the downstream side, there are cases where the $SO_x$ will end up passing through the $SO_x$ trap catalyst. If $SO_x$ passes through the $SO_x$ trap catalyst in such a way, regardless of whether there is a sufficient $SO_x$ trapping ability remaining in the $SO_x$ trap catalyst, the $SO_x$ trap rate will be judged to have fallen, that is, the $SO_x$ trap catalyst will be judged to have become unable to withstand use. In this case, in the aforementioned internal combustion engine, restoration of the $SO_x$ trap rate is performed.

However, in this case, if the sufficient $SO_x$ trapping ability remaining in the $SO_x$ trap catalyst is applied, the period until the $SO_x$ trap catalyst becomes unable to withstand use may be extended. That is, the lifetime of the $SO_x$ trap catalyst may be prolonged.

DISCLOSURE OF THE INVENTION

An object of the present invention is to provide an exhaust purification device of an internal combustion engine able to prolong the lifetime of an $SO_x$ trap catalyst.

According to the present invention, there is provided an exhaust purification device of an internal combustion engine arranging in an engine exhaust passage an $SO_x$ trap catalyst able to trap $SO_x$ contained in an exhaust gas, wherein when $SO_x$ trapped at the upstream side of the $SO_x$ trap catalyst should be moved to the downstream side to make use of an $SO_x$ trapping ability of the $SO_x$ trap catalyst, an amount of hydrocarbons in the exhaust gas flowing into the $SO_x$ trap catalyst is increased to form a region in which an air-fuel ratio locally becomes rich in the $SO_x$ trap catalyst and, the amount of increase of hydrocarbons is set so that the $SO_x$ released from the $SO_x$ trap catalyst in the region is trapped in the $SO_x$ trap catalyst in the downstream once again without flowing out from the downstream end of the $SO_x$ trap catalyst and thereby restoring an $SO_x$ trap rate and prolonging an $SO_x$ trap catalyst lifetime.

BEST MODE FOR CARRYING OUT THE INVENTION

Figure 1:
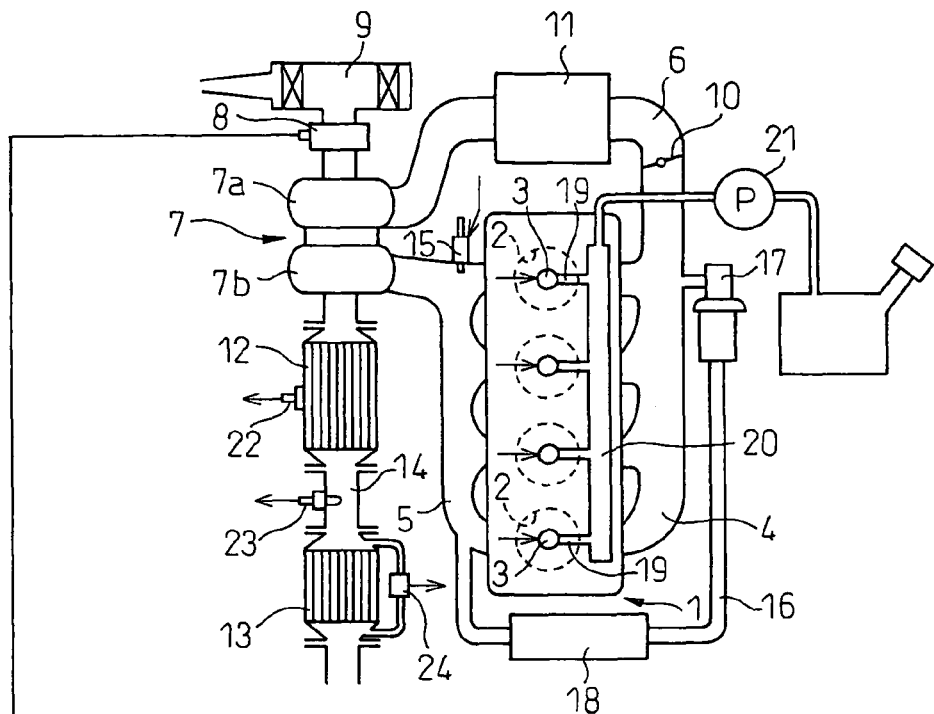
FIG. 1 is an overview of a compression ignition type internal combustion engine.
Figure 1:
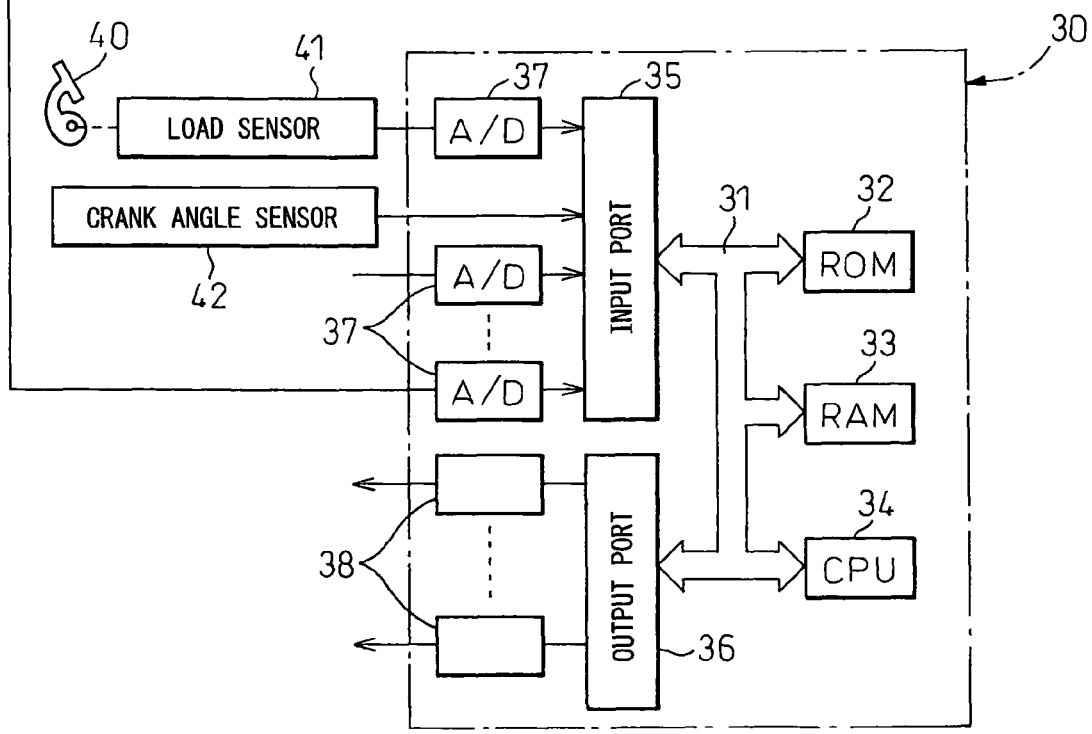

FIG. 1 shows an overview of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7. The inlet of the compressor 7a is connected to an air cleaner 9 via an intake air amount detector 8. Inside the intake duct 6 is arranged a throttle valve 10 driven by a step motor. Further, around the intake duct 6 is arranged a cooling device (intercooler) 11 for cooling the intake air flowing through the inside of the intake duct 6. In the embodiment shown in FIG. 1, the engine cooling water is guided into the cooling device 11. The engine cooling water cools the intake air. On the other hand, the exhaust manifold 5 is connected to the inlet of an exhaust turbine 7b of the exhaust turbocharger 7, while the outlet of the exhaust turbine 7b is connected to the inlet of an $SO_x$ trap catalyst 12. Further, the outlet of the $SO_x$ trap catalyst 12 is connected through an exhaust pipe 14 to an $NO_x$ storing catalyst 13. A hydrocarbon supply valve 15 for supplying hydrocarbons comprised of for example fuel into the exhaust gas is arranged in the exhaust manifold 5.

The exhaust manifold 5 and the intake manifold 4 are interconnected through an exhaust gas recirculation (hereinafter referred to as an "EGR") passage 16. The EGR passage 16 is provided with an electronically controlled EGR control valve 17. Further, around the EGR passage 16 is arranged a cooling device 18 for cooling the EGR gas flowing through the inside of the EGR passage 16. In the embodiment shown in FIG. 1, the engine cooling water is guided into the cooling device 18. The engine cooling water cools the EGR gas. On the other hand, each fuel injector 3 is connected through a fuel feed tube 19 to a common rail 20. This common rail 20 is supplied with fuel from an electronically controlled variable discharge fuel pump 21. The fuel supplied into the common rail 20 is supplied through each fuel feed tube 19 to the fuel injector 3.

An electronic control unit 30 is comprised of a digital computer provided with a read only memory (ROM) 32, a random access memory (RAM) 33, a microprocessor (CPU) 34, an input port 35, and an output port 36 all connected to each other by a bidirectional bus 31. The $SO_x$ trap catalyst 12 is provided with a temperature sensor 22 for detecting the temperature of the $SO_x$ trap catalyst 12. A sensor 23 for detecting $SO_x$ concentration or HC concentration in the exhaust gas flowing out from the $SO_x$ trap catalyst 12 is arranged in the exhaust pipe 14. The output signals of the temperature sensor 22 and the sensor 23 are input through corresponding AD converters 37 to the input port 35. Further, the $NO_x$ storing catalyst 13 is provided with a differential pressure sensor 24 for detecting the differential pressure before and after the $NO_x$ storing catalyst 13. The output signal of the differential pressure sensor 24 is input through the corresponding AD converter 37 to the input port 35.

An accelerator pedal 40 has a load sensor 41 generating an output voltage proportional to the amount of depression L of the accelerator pedal 40 connected to it. The output voltage of the load sensor 41 is input through a corresponding AD converter 37 to the input port 35. Further, the input port 35 has a crank angle sensor 42 generating an output pulse each time the crankshaft turns for example by 15 degrees connected to it. On the other hand, the output port 36 is connected through corresponding drive circuits 38 to the fuel injectors 3, step motor for driving the throttle valve 10, hydrocarbon supply valve 15, EGR control valve 17, and fuel pump 21.

First, explaining the $NO_x$ storing catalyst 13 shown in FIG. 1, the $NO_x$ storing catalyst 13 is carried on a three-dimensional mesh structure monolith carrier or pellet carriers or is carried on a honeycomb structure particulate filter. In this way, the $NO_x$ storing catalyst 13 can be carried on various types of carriers, but below, the explanation will be made of the case of carrying the $NO_x$ storing catalyst 13 on a particulate filter.

Figure 2:
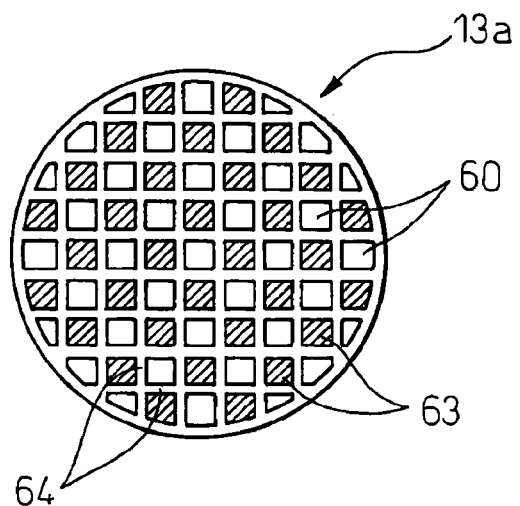
FIG. 2 is a view showing the structure of a particulate filter.
Figure 2:
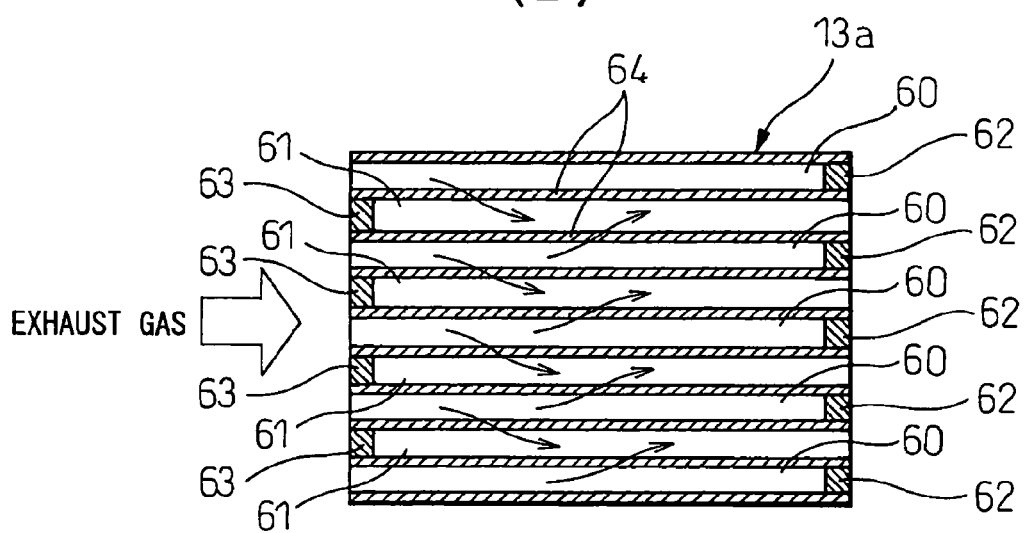

FIGS. 2(A) and 2(B) show the structure of the particulate filter 13a carrying the $NO_x$ storing catalyst 13. Note that FIG. 2(A) is a front view of the particulate filter 13a, while FIG. 2(B) is a side sectional view of the particulate filter 13a. As shown in FIGS. 2(A) and 2(B), the particulate filter 1Aa forms a honeycomb structure and is provided with a plurality of exhaust passages 60 and 61 extending in parallel with each other. These exhaust passages are comprised by exhaust gas inflow passages 60 with downstream ends sealed by plugs 62 and exhaust gas outflow passages 61 with upstream ends sealed by plugs 63. Note that the hatched portions in FIG. 2(A) show plugs 63. Therefore, the exhaust gas inflow passages 60 and the exhaust gas outflow passages 61 are arranged alternately through thin wall partitions 64. In other words, the exhaust gas inflow passages 60 and the exhaust gas outflow passages 61 are arranged so that each exhaust gas inflow passage 60 is surrounded by four exhaust gas outflow passages 61, and each exhaust gas outflow passage 61 is surrounded by four exhaust gas inflow passages 60.

The particulate filter 13a is formed from a porous material such as for example cordierite. Therefore, the exhaust gas flowing into the exhaust gas inflow passages 60 flows out into the adjoining exhaust gas outflow passages 61 through the surrounding partitions 64 as shown by the arrows in FIG. 2(B).

Figure 3:
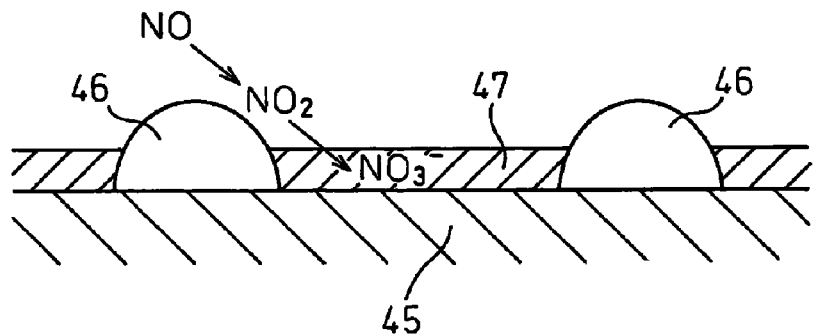
FIG. 3 is a cross-sectional view of a surface part of a catalyst carrier of an $NO_x$ storing catalyst.

When the $NO_x$ storing catalyst 13 is carried on the particulate filter 13a in this way, the peripheral walls of the exhaust gas inflow passages 60 and exhaust gas outflow passages 61, that is, the surfaces of the two sides of the partitions 64 and inside walls of the fine holes of the partitions 64 carry a catalyst carrier comprised of alumina. FIG. 3 schematically shows the cross-section of the surface part of this catalyst carrier 45. As shown in FIG. 3, the catalyst carrier 45 carries a precious metal catalyst 46 diffused on its surface. Further, the catalyst carrier 45 is formed with a layer of an $NO_x$ absorbent 47 on its surface.

In this embodiment of the present invention, platinum Pt is used as the precious metal catalyst 46. As the ingredient forming the $NO_x$ absorbent 47, for example, at least one element selected from potassium K, sodium Na, cesium Cs, or another alkali metal, barium Ba, calcium Ca, or another alkali earth, lanthanum La, yttrium Y, or another rare earth may be used.

If the ratio of the air and fuel (hydrocarbons) supplied to the engine intake passage, combustion chambers 2, and exhaust passage upstream of the $NO_x$ storing catalyst 13 is referred to as the "air-fuel ratio of the exhaust gas", the $NO_x$ absorbent 47 performs an $NO_x$ absorption and release action of storing the $NO_x$ when the air-fuel ratio of the exhaust gas is lean and releasing the stored $NO_x$ when the oxygen concentration in the exhaust gas falls.

That is, if explaining this taking as an example the case of using barium Ba as the ingredient forming the $NO_x$ absorbent 47, when the air-fuel ratio of the exhaust gas is lean, that is, when the oxygen concentration in the exhaust gas is high, the NO contained in the exhaust gas is oxidized on the platinum Pt 46 such as shown in FIG. 3 to become $NO_2$, then is absorbed in the $NO_x$ absorbent 47 and diffuses in the $NO_x$ absorbent 47 in the form of nitric acid ions $NO_3^-$ while bonding with the barium oxide BaO. In this way, the $NO_x$ is absorbed in the $NO_x$ absorbent 47. So long as the oxygen concentration in the exhaust gas is high, $NO_2$ is produced on the surface of the platinum Pt 46. So long as the $NO_x$ absorbing capability of the $NO_x$ absorbent 47 is not saturated, the $NO_2$ is absorbed in the $NO_x$ absorbent 47 and nitric acid ions $NO_3^-$ are produced.

As opposed to this, by supplying hydrocarbons from the hydrocarbon supply valve 15 to make the air-fuel ratio of the exhaust gas rich or the stoichiometric air-fuel ratio, since the oxygen concentration in the exhaust gas falls, the reaction proceeds in the reverse direction ($NO_3^- \rightarrow NO_2$) and therefore the nitric acid ions $NO_3^-$ in the $NO_x$ absorbent 47 are released from the $NO_x$ absorbent 47 in the form of $NO_2$. Next, the released $NO_x$ is reduced by the unburned hydrocarbons or CO included in the exhaust gas.

In this way, when the air-fuel ratio of the exhaust gas is lean, that is, when burning fuel under a lean air-fuel ratio, the $NO_x$ in the exhaust gas is absorbed in the $NO_x$ absorbent 47.

However, if continuing to burn fuel under a lean air-fuel ratio, during that time the $NO_x$ absorbing capability of the $NO_x$ absorbent 47 will end up becoming saturated and therefore $NO_x$ will end up no longer being able to be absorbed by the $NO_x$ absorbent 47. Therefore, in this embodiment according to the present invention, before the absorbing capability of the $NO_x$ absorbent 47 becomes saturated, hydrocarbons are supplied from the hydrocarbon supply valve 15 so as to temporarily make the air-fuel ratio of the exhaust gas rich and thereby release the $NO_x$ from the $NO_x$ absorbent 47.

However, exhaust gas contains $SO_x$, that is, $SO_2$. When this $SO_2$ flows into the $NO_x$ storing catalyst 13, this $SO_2$ is oxidized at the platinum Pt 46 and becomes $SO_3$. Next, this $SO_3$ is absorbed in the $NO_x$ absorbent 47 and bonds with the barium oxide BaO while diffusing in the $NO_x$ absorbent 47 in the form of sulfate ions $SO_4^{2-}$ to produce the stable sulfate $BaSO_4$. However, the $NO_x$ absorbent 47 has a strong basicity, so this sulfate $BaSO_4$ is stable and hard to decompose. If just making the air-fuel ratio of the exhaust gas rich, the sulfate $BaSO_4$ will remain without being decomposed. Therefore, in the $NO_x$ absorbent 47, the sulfate $BaSO_4$ will increase along with the elapse of time and therefore the amount of $NO_x$ which the $NO_x$ absorbent 47 can absorb will fall along with the elapse of time.

In this case, however, if raising the temperature of the $NO_x$ storing catalyst 13 to the $SO_x$ release temperature of 600° C. or more and in that state making the air-fuel ratio of the exhaust gas flowing into the $NO_x$ storing catalyst 13 rich, $SO_x$ will be released from the $NO_x$ absorbent 47. However, in this case, $SO_x$ will only be released from the $NO_x$ absorbent 47 a little at a time. Therefore, for release of all of the absorbed $SO_x$ from the $SO_x$ absorbent 47, the air-fuel ratio must be made rich for a long time and therefore there is the problem that a large amount of fuel or a reducing agent becomes necessary. Further, the $SO_x$ released from the $SO_x$ absorbent 47 is exhausted into the atmosphere. This is also not preferable.

Therefore, in the present invention, an $SO_x$ trap catalyst 12 is arranged upstream of the $NO_x$ storing catalyst 13 and this $SO_x$ trap catalyst 12 is used to trap the $SO_x$ contained in the exhaust gas and thereby prevent $SO_x$ from flowing into the $NO_x$ storing catalyst 13. Next, this $SO_x$ trap catalyst 12 will be explained.

Figure 4:
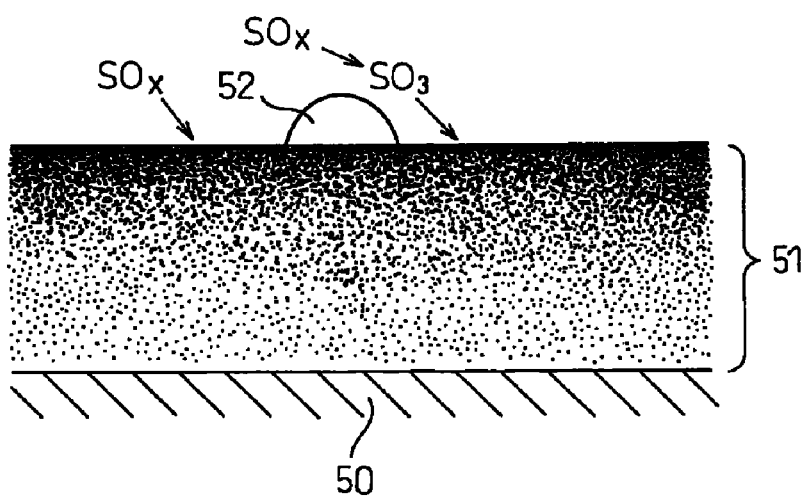
FIG. 4 is a cross-sectional view of a surface part of a substrate of an $SO_x$ trap catalyst.
Figure 4:
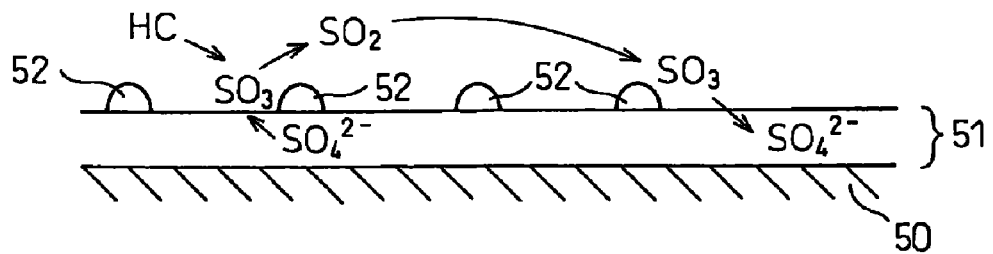

The $SO_x$ trap catalyst 12 is comprised of for example a honeycomb structure monolithic catalyst and has a large number of exhaust gas through holes extending straight in the axial direction of the $SO_x$ trap catalyst 12. FIG. 4(A) schematically shows the cross-section of the surface part of the inside peripheral walls of the exhaust gas through holes, i.e, the substrate in case where the $SO_x$ trap catalyst 12 is formed from a honeycomb structure monolithic catalyst in this way. As shown in FIG. 4(A), a coated layer 51 is formed on the surface of the substrate 50. Further, the coated layer 51 carries a precious metal catalyst 52 diffused on its surface.

In this embodiment of the present invention, platinum Pt is used as the precious metal catalyst 52. As the ingredient forming the coated layer 51, for example, at least one element selected from potassium K, sodium Na, cesium Cs, or another alkali metal, barium Ba, calcium Ca, or another alkali earth, lanthanum La, yttrium Y, or another rare earth may be used. That is, the coated layer 51 of the $SO_x$ trap catalyst 11 exhibits a strong basicity.

Therefore, the $SO_x$ contained in the exhaust gas, that is, the $SO_2$, is oxidized at the platinum 52 as shown in FIG. 4(A), then is trapped in the coated layer 51. That is, the $SO_2$ diffuses in the coated layer 51 in the form of sulfate ions $SO_4^{2-}$ to form a sulfate. Note that as explained above, the coated layer 51 exhibits a strong basicity. Therefore, part of the $SO_2$ contained in the exhaust gas is directly trapped in the coated layer 51 as shown in FIG. 4(A).

The concentration in the coated layer 51 in FIG. 4(A) shows the concentration of trapped $SO_x$. As will be understood from FIG. 4(A), the concentration of $SO_x$ in the coated layer 51 is highest near the surface of the coated layer 51 and gradually becomes lower the further deeper. If the $SO_x$ concentration near the surface of the coated layer 51 becomes high, the basicity of the surface of the coated layer 51 becomes weaker and the $SO_x$ trap capability becomes weaker. Therefore, if the percentage of the $SO_x$ trapped by the $SO_x$ trap catalyst 12 to the $SO_x$ contained in the exhaust gas is referred to as the "$SO_x$ trap rate", the $SO_x$ trap rate falls along with the basicity of the surface of the coated layer 51 becoming weaker.

This $SO_x$ trap rate is first close to 100 percent, but rapidly falls along with the elapse of time. Therefore, in the embodiment of the present invention, when the $SO_x$ trap rate falls below a predetermined rate, temperature raising control is performed to raise the temperature of the $SO_x$ trap catalyst 12 under a lean air-fuel ratio of the exhaust gas and thereby restore the $SO_x$ trap rate.

That is, if raising the temperature of the $SO_x$ trap catalyst 12 under a lean air-fuel ratio of the exhaust gas, the $SO_x$ concentrated near the surface of the coated layer 51 diffuses toward the deep part of the coated layer 51 so that the $SO_x$ concentration in the coated layer 51 becomes even. That is, the sulfate produced in the coated layer 51 changes from an unstable state concentrated near the surface of the coated layer 51 to a stable state evenly diffused across the entirety of the inside of the coated layer 51. If the $SO_x$ present near the surface of the coated layer 51 diffuses toward the deep part of the coated layer 51, the concentration of $SO_x$ near the surface of the coated layer 51 will fall. Therefore, when the temperature raising control of the $SO_x$ trap catalyst 12 is completed, the $SO_x$ trap rate will be restored.

When performing temperature raising control of the $SO_x$ trap catalyst 12, if making the temperature of the $SO_x$ trap catalyst 12 substantially 450° C. or so, the $SO_x$ present near the surface of the coated layer 51 can be made to diffuse in the coated layer 51. If raising the temperature of the $SO_x$ trap catalyst 12 to about 600° C., the concentration of $SO_x$ in the coated layer 51 can be made considerably even. Therefore, at the time of temperature raising control of the $SO_x$ trap catalyst 12, it is preferable to raise the temperature of the $SO_x$ trap catalyst 12 to about 600° C. under a lean air-fuel ratio of the exhaust gas.

Note that when raising the temperature of the $SO_x$ trap catalyst 12, if making the air-fuel ratio of the exhaust gas rich, $SO_x$ will end up being released from the $SO_x$ trap catalyst 12. Therefore, when raising the temperature of the $SO_x$ trap catalyst 12, the air-fuel ratio of the exhaust gas is not made rich.

In this regard, the concentration of the $SO_x$ trapped in the $SO_x$ trap catalyst 12, as shown in FIG. 4(A), changes toward the interior of the coat layer 51, however, in the $SO_x$ trap catalyst 12, the $SO_x$ concentration at the surface part of the coat layer 51 further changes according to the position of the $SO_x$ trap catalyst 12 in the exhaust gas flow direction. Next, this will be explained referring to FIGS. 5(A) to (C).

Figure 5:
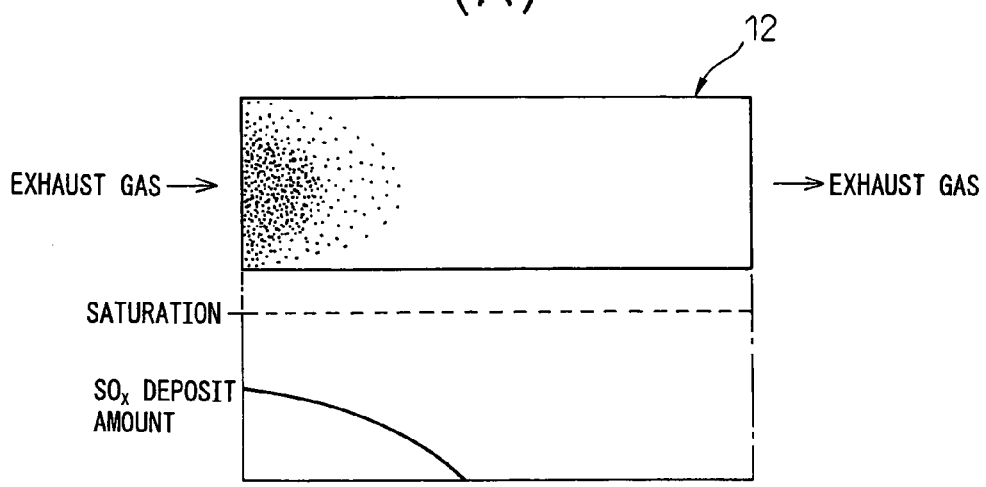
FIG. 5 is a view showing the change over time of an amount of $SO_x$ deposition.
Figure 5:
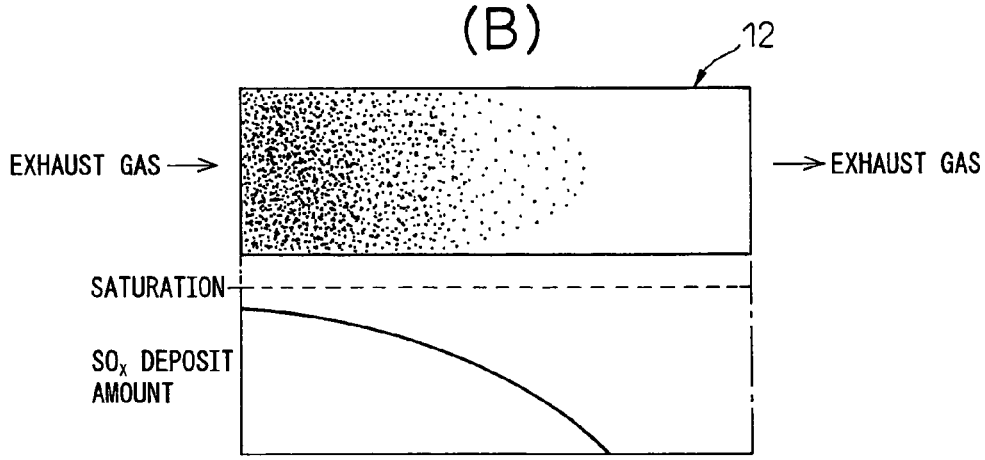
Figure 5:
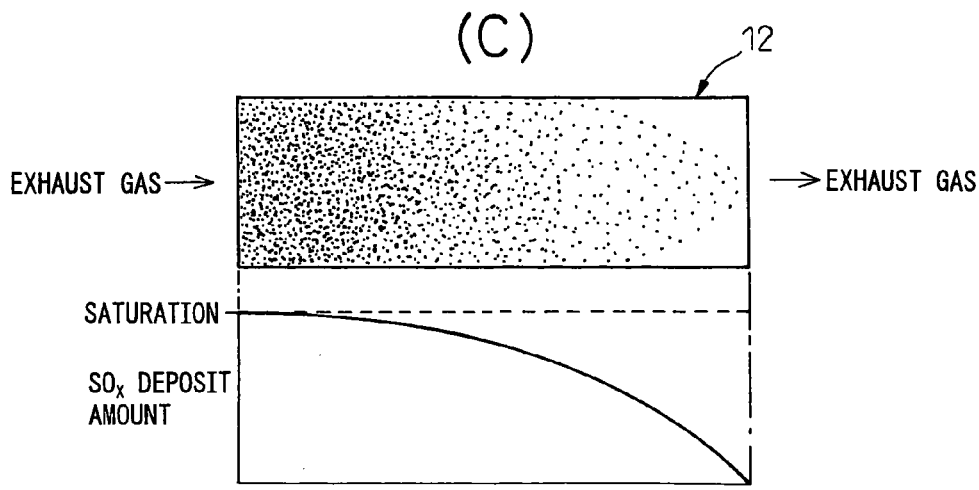

In FIGS. 5(A) to (C), the concentration of the $SO_x$ trapped at the surface part of the $SO_x$ trap catalyst 12, that is, the surface part of the coat layer 51, is shown with shading. Further, in FIGS. 5(A) to (C), the amount of deposition of $SO_x$ deposited at the surface part of the $SO_x$ trap catalyst 12, that is, the surface part of the coat layer 51, is shown by a curve. Note that, (A), (B), and (C) of FIG. 5 show a change over time in that order. It is learned from FIGS. 5(A) to (C) that, along with the passage of time, $SO_x$ deposits on the surface part of the coat layer 51 in order from the upstream side and accordingly, the $SO_x$ trapping ability is lost in order from the upstream side.

Next, when the state shown in FIG. 5(C) is reached, the $SO_x$ trap catalyst 12 soon begins to exhaust SOX. However, it is learned that sufficient $SO_x$ trapping ability still remains at this time at the downstream side of the $SO_x$ trap catalyst 12. Accordingly, if able to utilize the $SO_x$ trapping ability remaining at this time, the $SO_x$ can be trapped by the $SO_x$ trap catalyst 12 without the $SO_x$ trap catalyst 12 exhausting $SO_x$.

Therefore, in the present invention, to utilize the remaining $SO_x$ trapping ability, when, for example, the state shown in FIG. 5(C) has been reached, the amount of hydrocarbons, for example, the fuel, flowing into the $SO_x$ trap catalyst 12 is increased so as to form a region in which an air-fuel ratio locally becomes rich in the $SO_x$ trap catalyst 12. The $SO_x$ released from the $SO_x$ trap catalyst 12 in this region is trapped in the $SO_x$ trap catalyst 12 once again at the downstream side without flowing out from the downstream end of the $SO_x$ trap catalyst 12.

That is, if the amount of hydrocarbons flowing into the $SO_x$ trap catalyst 12 is increased and thus for example the air-fuel ratio at the upstream end of the $SO_x$ trap catalyst 12 becomes locally rich, as shown in FIG. 4(B), excess hydrocarbons in the rich region reduce the $SO_x$ on the platinum 52 and as a result $SO_x$ trapped in the form of the sulfate $SO_4^{2-}$ is released in the form of $SO_2$. The $SO_x$ released at this time proceeds toward the downstream and is trapped once again in the $SO_x$ trap catalyst 12 at a place having an $SO_x$ trapping ability at the downstream side. That is, as will be understood from FIG. 4(B), $SO_x$ trapped at the upstream side of the $SO_x$ trap catalyst 12 is made to move toward the downstream side.

If the release action of the $SO_x$ trapped at the upstream end of the $SO_x$ trap catalyst 12 progresses, the excessive hydrocarbons at the upstream end of the $SO_x$ trap catalyst 12 will cease being consumed for the $SO_x$ reduction, therefore the excessive hydrocarbons will be used to reduce the $SO_x$ at the downstream side where the release action of $SO_x$ has not progressed so much. In this manner, the release action of the $SO_x$ progresses from the upstream side to the downstream side, and the released $SO_x$ is trapped once again in the $SO_x$ trap catalyst 12 at the downstream side. As a result, as shown in FIG. 7, the $SO_x$ trapping ability at the upstream side of the $SO_x$ trap catalyst 12 is restored.

Figure 7:
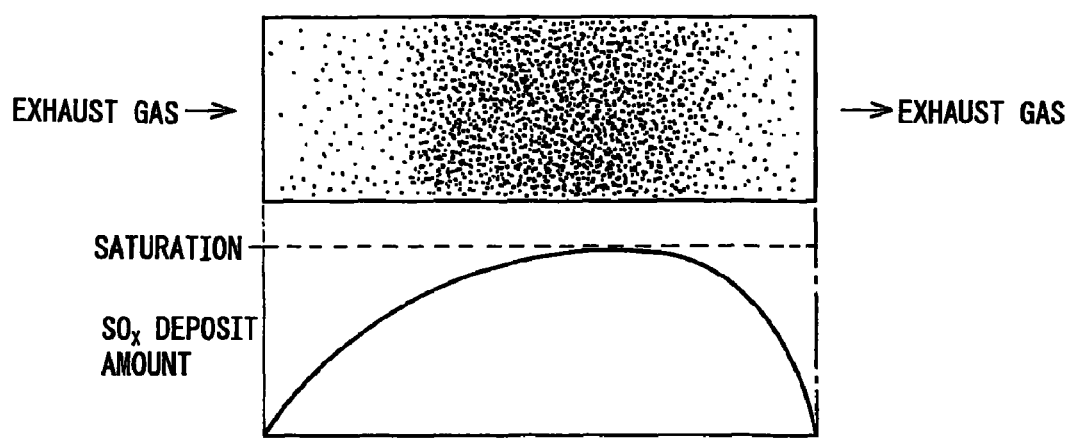
FIG. 7 is a view showing an amount of $SO_x$ deposition.

In this manner, in the present invention, if the $SO_x$ trap rate is about to fall or if the $SO_x$ trap rate begins to fall, as shown in FIG. 7, the region where the $SO_x$ is deposited is made to move toward the downstream side. That is, the peak of the $SO_x$ deposit distribution is made to move to the downstream side. As a result, the $SO_x$ trap rate is restored, thereby prolonging the life of the $SO_x$ trap catalyst 12.

Figure 6:
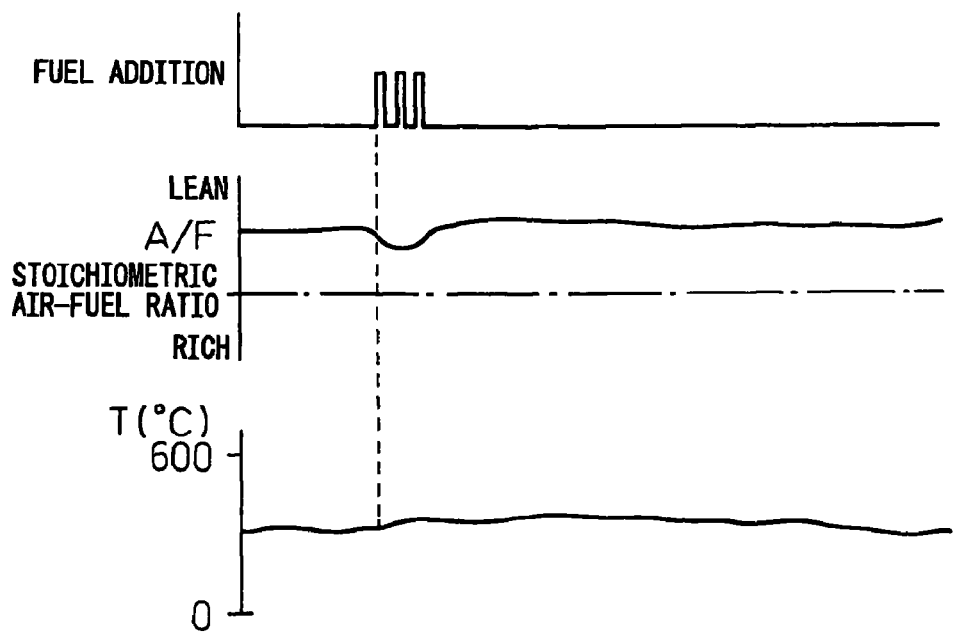
FIG. 6 is a time chart showing the change etc. in an air-fuel ratio of exhaust gas when adding fuel for prolonging the lifetime.

When performing such a life prolonging treatment of the $SO_x$ trap catalyst 12, in an embodiment according to the present invention, as shown in FIG. 6, fuel is fed from the hydrocarbon feed valve 15. At this time, as shown in FIG. 6, the average air-fuel ratio of the exhaust gas will fall slightly but be kept lean, and the temperature T of the $SO_x$ trap catalyst 12 will also not change so much. When performing the life prolonging treatment of the $SO_x$ trap catalyst 12, it is most important that $SO_x$ not be exhausted from the $SO_x$ trap catalyst 12. Accordingly in the present invention, the amount of increase of the hydrocarbons is set so that, in a region in which an air-fuel ratio becomes locally rich, the $SO_x$ released from the $SO_x$ trap catalyst 12 is trapped once again in the $SO_x$ trap catalyst 12 at the downstream side without flowing out from the downstream end of the $SO_x$ trap catalyst 12.

Figure 8:
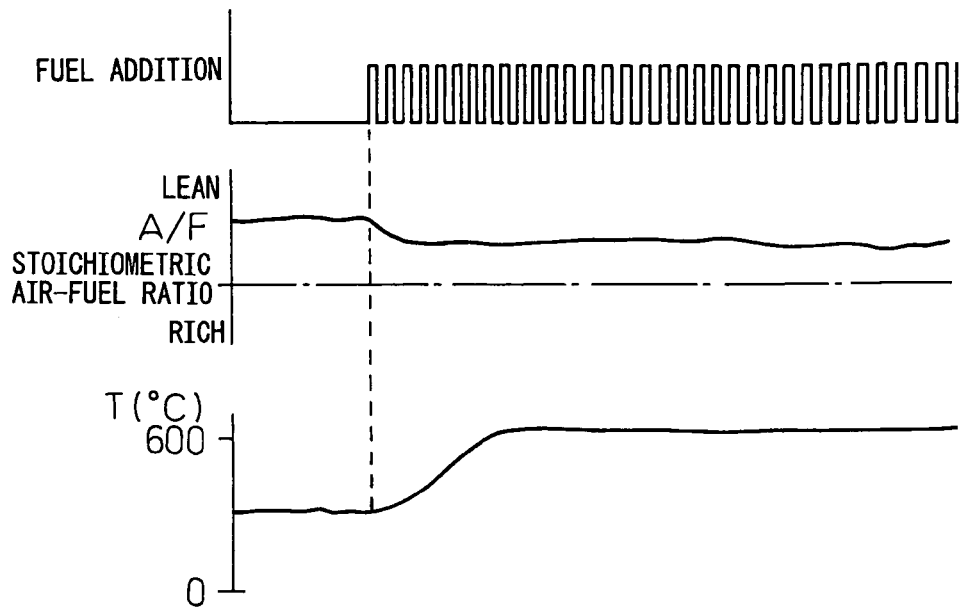
FIG. 8 is a time chart showing the change in the air-fuel ratio of exhaust gas etc. when adding fuel for regeneration treatment.

When the $SO_x$ trap rate falls after performing the life prolonging treatment of the $SO_x$ trap catalyst 12, the temperature of the $SO_x$ trap catalyst 12 is raised to about 600° C., thereby restoring the $SO_x$ trap rate. FIG. 8 shows the regeneration control for this $SO_x$ trap rate restoration. As shown in FIG. 8, under a lean air-fuel ratio of the exhaust gas, fuel is fed from the hydrocarbon feed valve 15 and the temperature T of $SO_x$ trap catalyst 12 is raised to about 600° C. using the heat of the reaction of the oxidization of this fuel.

Next, an embodiment estimating the trapped amount of $SO_x$ in the $SO_x$ trap catalyst 12 and performing life prolonging treatment and regeneration control based on the estimated $SO_x$ amount will be explained.

Figure 9:
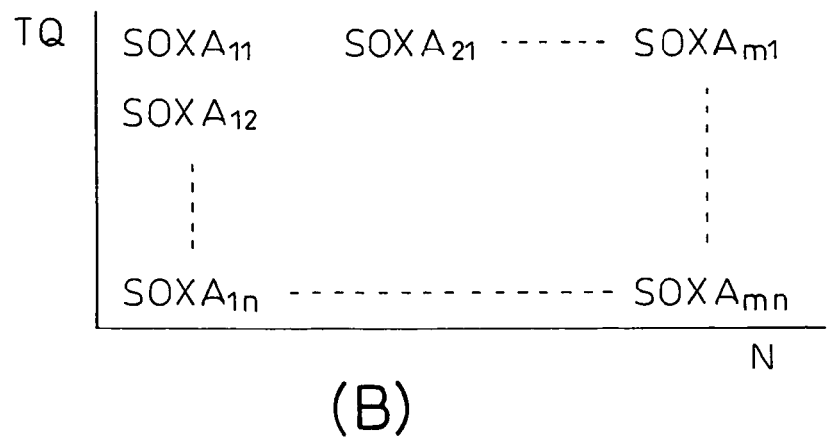
FIG. 9 is a view showing a map of $SO_x$ trapped amounts SOXA and SOXB.
Figure 9:
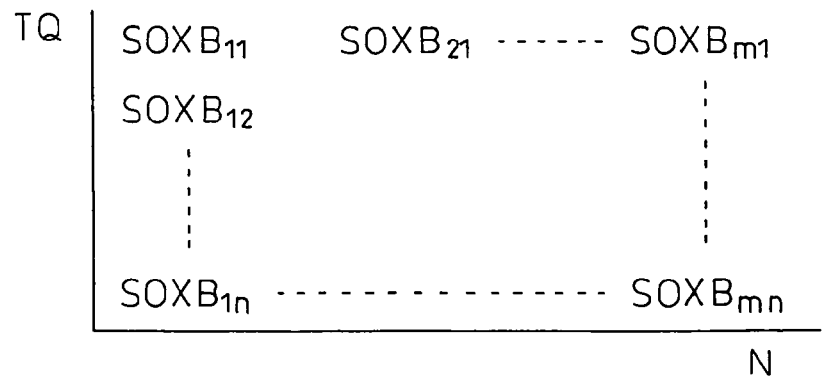

That is, fuel contains a certain ratio of sulfur. Therefore, the amount of $SO_x$ contained in the exhaust gas, that is, the amount of $SO_x$ trapped by the $SO_x$ trap catalyst 12, is proportional to the fuel injection amount. The fuel injection amount is a function of the required torque and the engine speed. Therefore, the amount of $SO_x$ trapped by the $SO_x$ trap catalyst 12 also becomes a function of the required torque and the engine speed. In this embodiment of the present invention, the $SO_x$ amount SOXA trapped per unit time in the $SO_x$ trap catalyst 12 is stored as a function of the required torque TQ and the engine speed N in the form of a map as shown in FIG. 9(A) in advance in the ROM 32.

Further, lubrication oil contains a certain ratio of sulfur. The amount of lubrication oil burned in a combustion chamber 2, that is, the amount of $SO_x$ contained in the exhaust gas and trapped in the $SO_x$ trap catalyst 12, becomes a function of the required torque and the engine speed. In this embodiment of the present invention, the amount SOXB of $SO_x$ contained in the lubrication oil and trapped per unit time in the $SO_x$ trap catalyst 12 is stored as a function of the required torque TQ and the engine speed N in the form of a map as shown in FIG. 9(B) in advance in the ROM 32. By cumulatively adding the $SO_x$ amount SOXA and the $SO_x$ amount SOXB, the $SO_x$ amount ΣSOX trapped in the $SO_x$ trap catalyst 12 is calculated.

Figure 10:
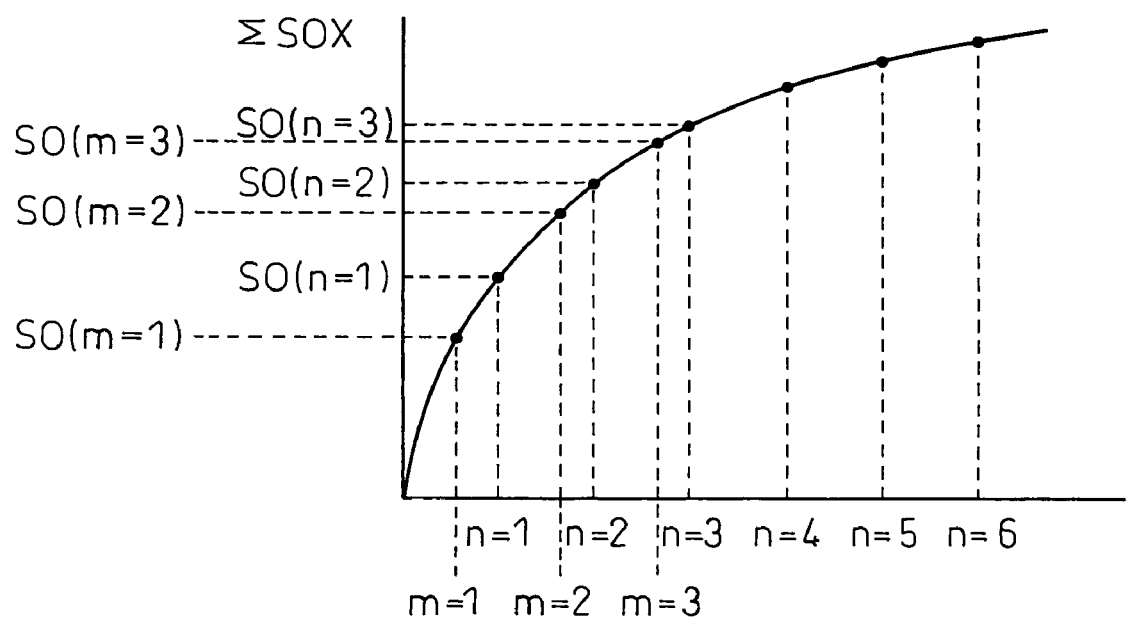
FIG. 10 is a view showing the relationship etc. of an $SO_x$ trapped amount ΣSOX and an $SO_x$ trapped amount SO(m) when lifetime prolonging treatment should be performed.

Further, in this embodiment of the present invention, as shown in FIG. 10, the relationship between the $SO_x$ amount ΣSOX and the predetermined $SO_x$ amount SO(n) when the $SO_x$ trap catalyst 12 should be regenerated is stored in advance. When the $SO_x$ amount ΣSOX exceeds the predetermined SO(n) (n=1, 2, 3, . . . ), regenerating control of the $SO_x$ trap catalyst 12 is performed. Note that in FIG. 10, n shows the number of times of the regenerating control. As will be understood from FIG. 10, as the number of times n of regenerating control for restoring the $SO_x$ trap rate increases, the predetermined amount SO(n) is increased. The rate of increase of the predetermined amount SO(n) is reduced the greater the number of times n of regenerating control. That is, the rate of increase of SO(d) to SO(2) is reduced from the rate of increase of SO(2) to SO(1).

Further, in the present invention, life prolonging treatment of the $SO_x$ trap catalyst 12 is performed before performing the regeneration control of the $SO_x$ trap catalyst 12. In this embodiment according to the present invention, as shown in FIG. 10, the relationship between the $SO_x$ amount ΣSOX and the predetermined $SO_x$ amount SO(m) when life prolonging treatment should be performed on the $SO_x$ trap catalyst 12 is stored in advance. When the SOX amount ΣSOX has exceeded the predetermined SO(m) (m=1, 2, 3, . . . ), life prolonging treatment of the $SO_x$ trap catalyst 12 is performed. Note that, in FIG. 10, m shows the number of times of the prolonging treatment.

Next, referring to FIG. 11, the treatment routine of the $SO_x$ trap catalyst 12 will be explained.

Figure 11:
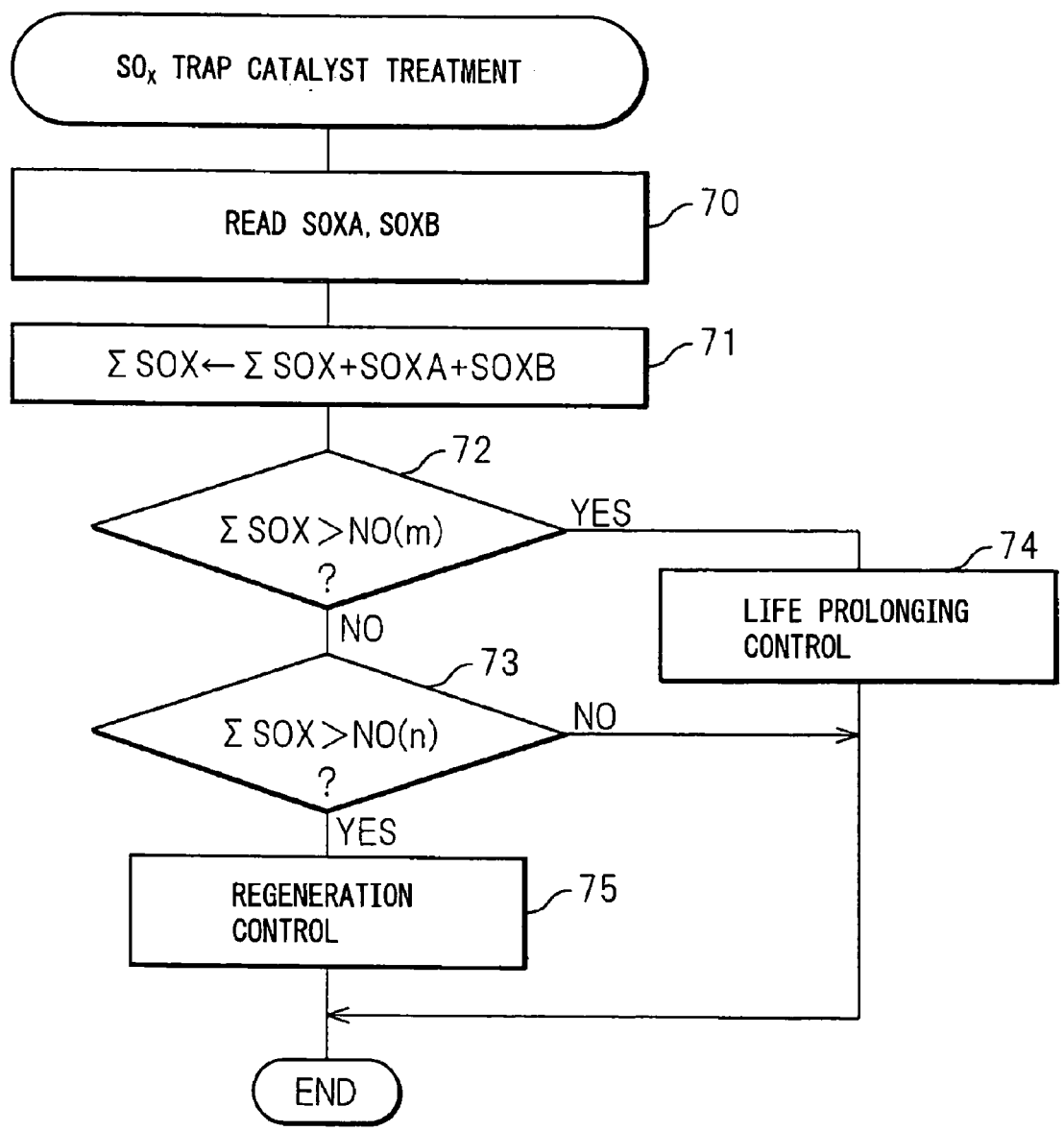
FIG. 11 is a flow chart for treating the $SO_x$ trap catalyst.

Referring to FIG. 11, first, at step 70, the SOX amounts SOXA and SOXB trapped per unit time are read from FIGS. 9(A) and (B). Next at step 71, the sum of these SOXA and SOXB is added to the $SO_x$ amount ΣSOX. Next at step 72, it is judged if the $SO_x$ amount ΣSOX has reached the predetermined amount SO(m) (m=1, 2, 3, ...) shown in FIG. 10. When the $SO_x$ amount ΣSOX has not reached the predetermined amount SO(m), the routine proceeds to step 73.

At step 73, it is judged if the $SO_x$ amount ΣSOX has reached the predetermined amount SO(n) (n=1, 2, 3, ...) shown in FIG. 10. When the $SO_x$ amount ΣSOX has not reached the predetermined amount SO(n), the treatment cycle is finished. In contrast, when it is judged at step 72 that the $SO_x$ amount ΣSOX has reached the predetermined amount SO(m), the routine proceeds to step 74 where life prolonging control is performed for life prolonging treatment. On the other hand, when it is judged at step 73 that the $SO_x$ amount ΣSOX has reached the predetermined amount SO(n), the routine proceeds to step 75 where regeneration control is performed.

Figure 12:
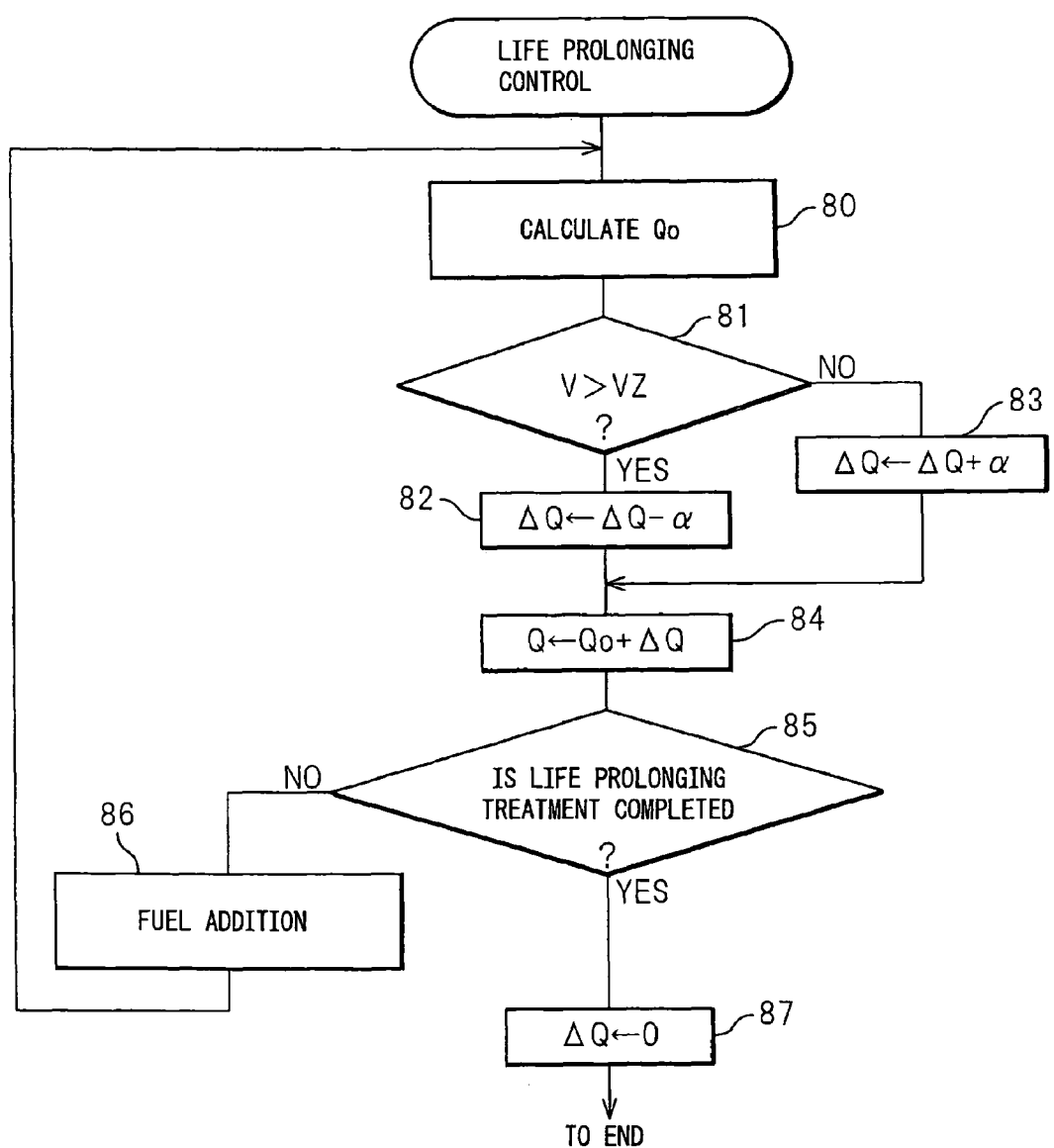
FIG. 12 is a flow chart of life prolonging control.

FIG. 12 shows one embodiment of life prolonging control executed at step 74 of FIG. 11. Note that, in this embodiment, as a sensor 23 shown in FIG. 1, an HC concentration sensor detecting the HC concentration in exhaust gas is used. Based on the HC concentration detected by this HC concentration sensor 23, the fuel amount added from the hydrocarbon feed valve 15 is controlled so that HC is not exhausted from the $SO_x$ trap catalyst 12 during the life prolonging treatment.

That is, referring to FIG. 12, first, at step 80, the basic fuel addition amount Qo is calculated. Next, at step 81, it is judged if the output voltage V of the HC concentration sensor 23 has exceeded the predetermined setting VZ, that is, if the HC concentration has exceeded a predetermined setting concentration. When V>VZ, the routine proceeds to step 82, where a constant value is deducted from the correction amount ΔQ for the fuel addition amount. Next, the routine proceeds to step 84. In contrast, when V≦VZ, the routine proceeds to step 83, where a constant value α is added to the correction amount ΔQ, then the routine proceeds to step 84.

At step 84, the correction amount ΔQ is added to the basic fuel addition amount Qo. The result of the addition is made the fuel addition amount Q. Next at step 85, it is judged if the life prolonging treatment has been completed. When the life prolonging treatment has not been completed, the routine proceeds to step 86, where fuel is added, and the routine returns to step 80. In contrast, when the life prolonging treatment has been completed, the routine proceeds to step 87, where the correction amount ΔQ is cleared.

Figure 13:
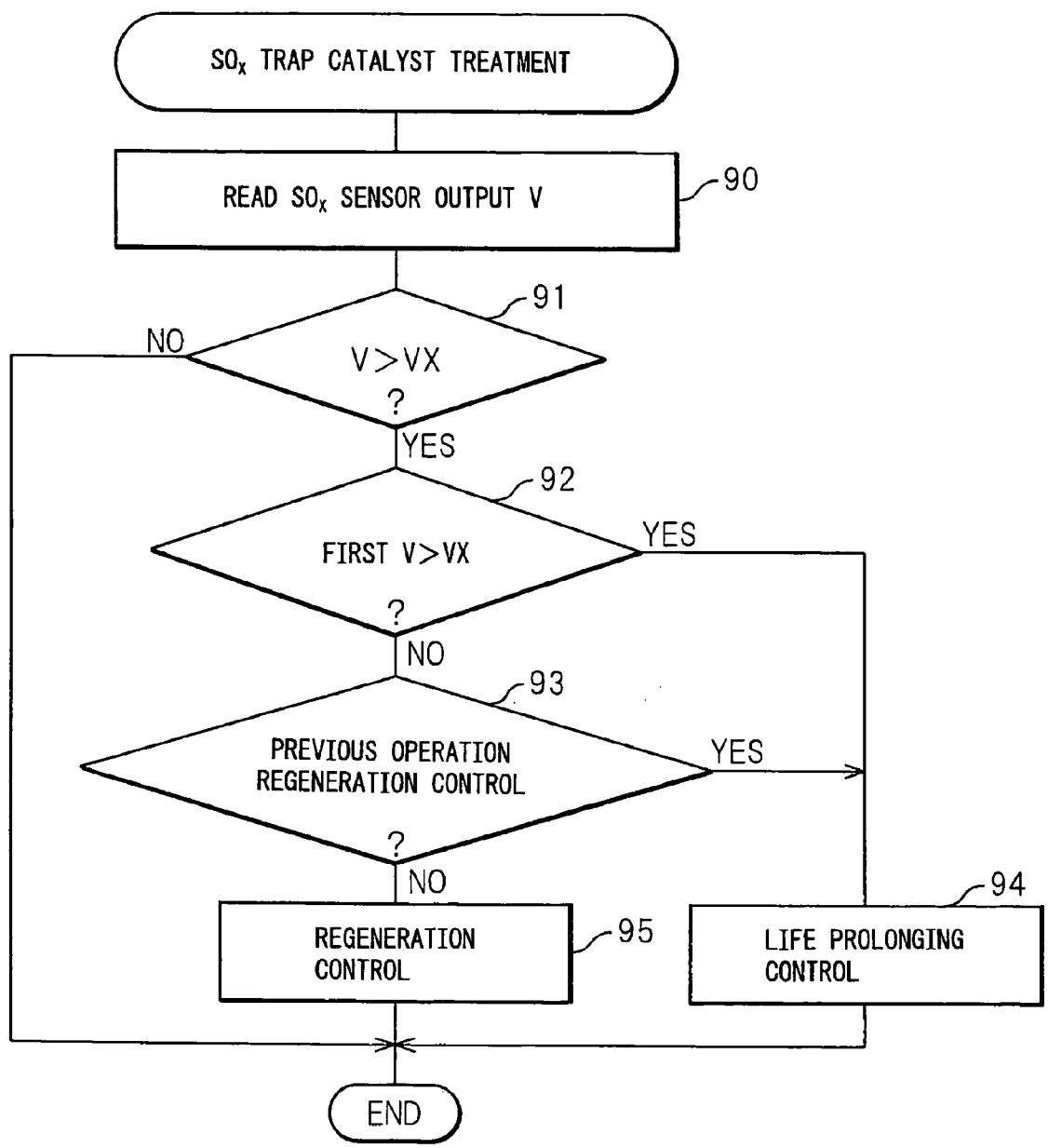
FIG. 13 is a flow chart for treating the $SO_x$ trap catalyst.
Figure 14:
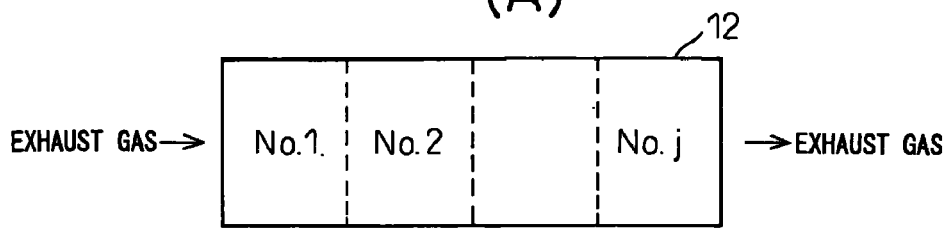
FIG. 14 is a view showing a model $SO_x$ trap catalyst.
Figure 14:
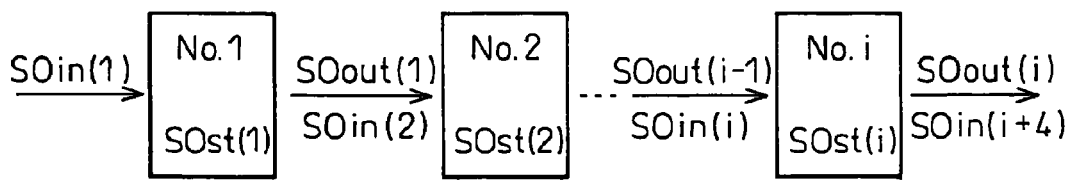
Figure 15:
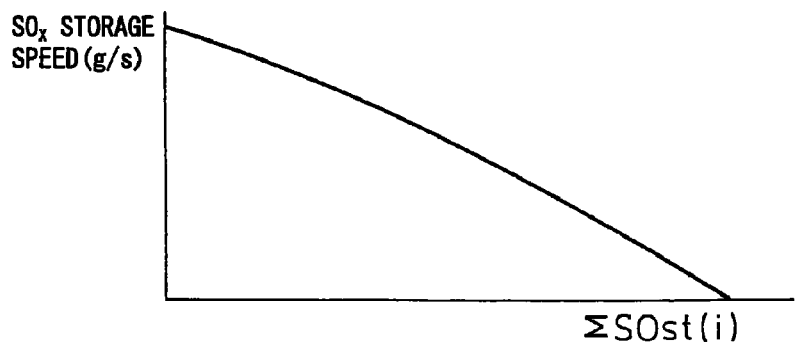
FIG. 15 is a view showing an $SO_x$ storage speed etc.
Figure 15:
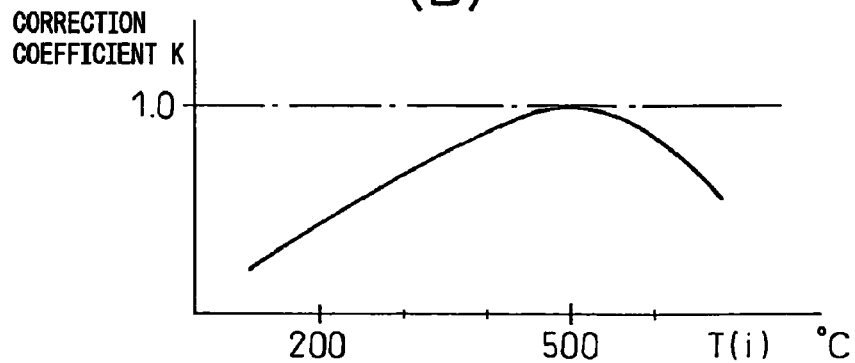

FIG. 13 shows a different embodiment for the treatment routine of the $SO_x$ trap catalyst 12 shown in FIG. 11. Note that, in this embodiment, as the sensor 23 shown in FIG. 1, an $SO_x$ sensor detecting the SOX concentration in exhaust gas is used, and based on the SOX concentration detected by the $SO_x$ sensor 23, life prolonging control and regeneration control are selectively performed.

That is, referring to FIG. 13, first, at step 90, the output V of the $SO_x$ sensor 23 is read. Next at step 91, it is judged if the output voltage V of the $SO_x$ sensor 23 has exceeded the predetermined setting VX, that is if the $SO_x$ concentration has exceeded the predetermined setting concentration. When V>VX, that is, when $SO_x$ begins to be exhausted from the $SO_x$ trap catalyst 12, the routine proceeds to step 92, where it is judged if it is the first time that V>VX. When it is the first time that V>VX, the routine proceeds to step 94 where life prolonging control is performed for life prolonging treatment.

In contrast, when it is not the first time that V>VX, the routine proceeds to step 93, where it is judged if the previous operation was regeneration control. When the previous operation is regeneration control, the routine proceeds to step 94, where life prolonging control is performed. In contrast, when regeneration control was not the previous operation, the routine proceeds to step 95, where regeneration control is performed. That is, when the $SO_x$ trap rate falls once again after the $SO_x$ trap catalyst 12 is prolonged in life, the temperature of the $SO_x$ trap catalyst 12 is raised under a lean air-fuel ratio of exhaust gas thereby restoring the $SO_x$ trap rate.

FIG. 14 to FIG. 20 show several embodiments of creating models of the distribution of deposition of the $SO_x$ in the $SO_x$ trap catalyst 12 and life prolonging control and regeneration control based on the model deposition distribution of SOX. That is, in these embodiments, as shown in FIG. 14(A), the $SO_x$ trap catalyst 12 is divided into a plurality of catalyst regions No. 1 to No. j along the flow of exhaust gas, and the amount of trapped $SO_x$ is calculated in each divided catalyst region No. 1 to No. j. Therefore, first, referring to FIG. 14(B), the method of calculation of the amount of trapped $SO_x$ for each catalyst region No. 1 to No. j will be explained.

First, explaining the symbols used in FIG. 14(B), SOin(i) shows the amount of $SO_x$ (g/sec) flowing into a catalyst region No. i per unit time, SOst(i) shows the amount of $SO_x$ (g/sec) trapped and deposited in a catalyst region No. i per unit time, and SOout(i) shows the amount of $SO_x$ (g/sec) flowing out from a catalyst region No. i per unit time. Accordingly, SOout(i)=SOin(i)−SOst(i), and further SOin(i)=SOout(i−1) stands. Further, the amount of $SO_x$ deposited in a catalyst region No. i is the cumulative value ΣSOst(i) of the SOst(i).

The amount of $SO_x$ SOin(1) flowing per unit time in the catalyst region No. 1 positioned furthest upstream may be found from the sum of the $SO_x$ trapped amounts SOXA and SOXB shown in FIGS. 9(A) and (B) for example. On the other hand, the $SO_x$ amount SOst(i) deposited per unit time in each catalyst region No. i is controlled by the SOX storage speed (g/s) to the $SO_x$ trap catalyst 12. This SOX storage speed, as shown in FIG. 15(A), falls the more the $SO_x$ deposition amount ΣSOst(i) increases. Further, this $SO_x$ storage speed is a function of the catalyst bed temperature T(i) of the catalyst region No. i. The correction coefficient K corresponding to the $SO_x$ storage speed shown in FIG. 15(A) is shown in FIG. 15(B). Accordingly in the embodiment according to the present invention, by multiplying the $SO_x$ storage speed shown in FIG. 15(A) with the correction coefficient K shown in FIG. 15(B), the actual $SO_x$ storage speed may be found.

If the $SO_x$ amount SOin(i) flowing into the catalyst region No. i is smaller than the aforementioned actual $SO_x$ storage speed, all the $SO_x$ amount SOin(i) that flows inside is deposited in the catalyst region No. i. If the $SO_x$ amount SOin(i) flowing into the catalyst region No. i is larger than the aforementioned actual $SO_x$ storage speed, an $SO_x$ amount corresponding to the actual $SO_x$ storage speed among the $SO_x$ amount that flows is deposited in the catalyst region No. i, and the remaining $SO_x$ flows into the catalyst region No. (i+1) of the downstream side. Under this manner of thinking, the deposited SOX amount ΣSOst(i) of each catalyst region No. i is calculated.

Figure 16:
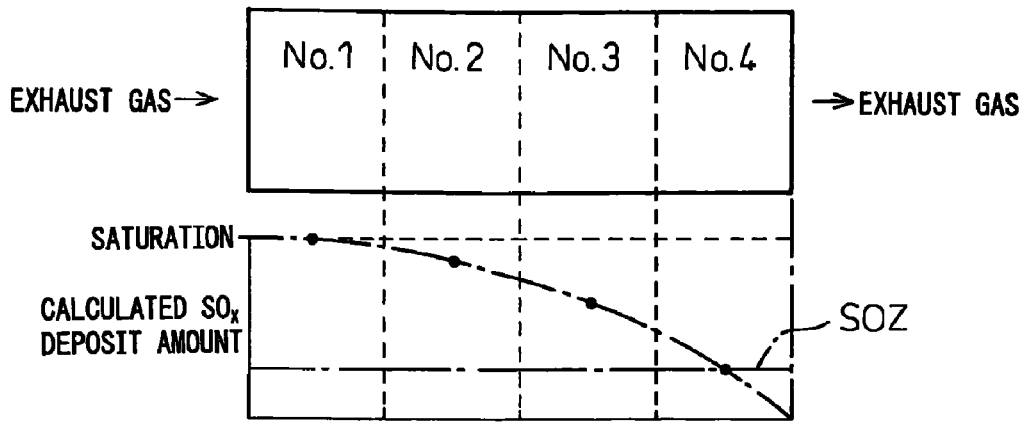
FIG. 16 is a view showing the calculated amount of $SO_x$ deposition.
Figure 17:
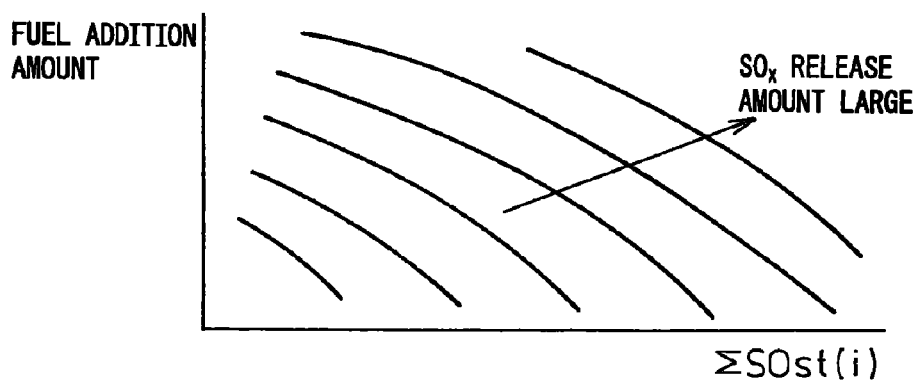
FIG. 17 is a view showing an amount of $SO_x$ release.
Figure 17:
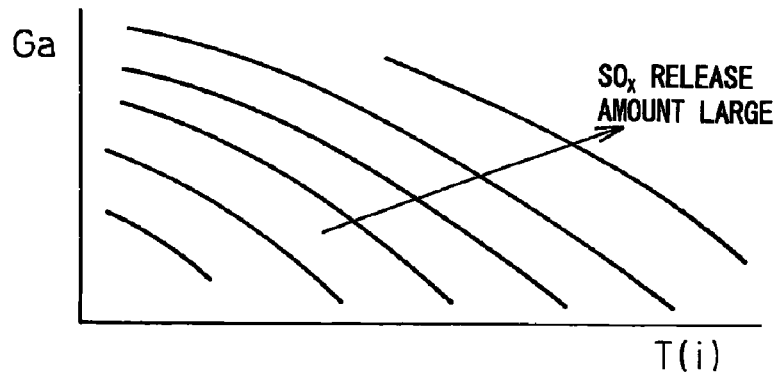

FIG. 16 shows an example of the results of calculation when dividing the $SO_x$ trap catalyst 12 into the four catalyst region No. 1 to No. 4. Note that, the black dots in FIG. 16 show the calculated $SO_x$ deposition amounts in the catalyst region No. 1 to No. 4. In the example shown in FIG. 16, life prolonging treatment of the $SO_x$ trap catalyst 12 is performed when the $SO_x$ trapped amount of the catalyst region No. 4 positioned furthest downstream exceeds the predetermined amount SOZ.

FIGS. 17(A) and (B) show the $SO_x$ release amount at the time of the life prolonging treatment of the $SO_x$ trap catalyst 12. Note that, in FIGS. 17(A) and (B), the curves show equal release amount lines. As shown in FIG. 17(A), the $SO_x$ release amount in each catalyst region No. increases the more the fuel addition amount increases and increases the more the $SO_x$ trapped amount $\Sigma SOst(i)$ increases, and as shown in FIG. 17(B), the $SO_x$ release amount in each catalyst region No. i increases the more the exhaust gas amount, that is, the intake air amount Ga, increases and increases the higher the catalyst bed temperature T(i).

Figure 18:
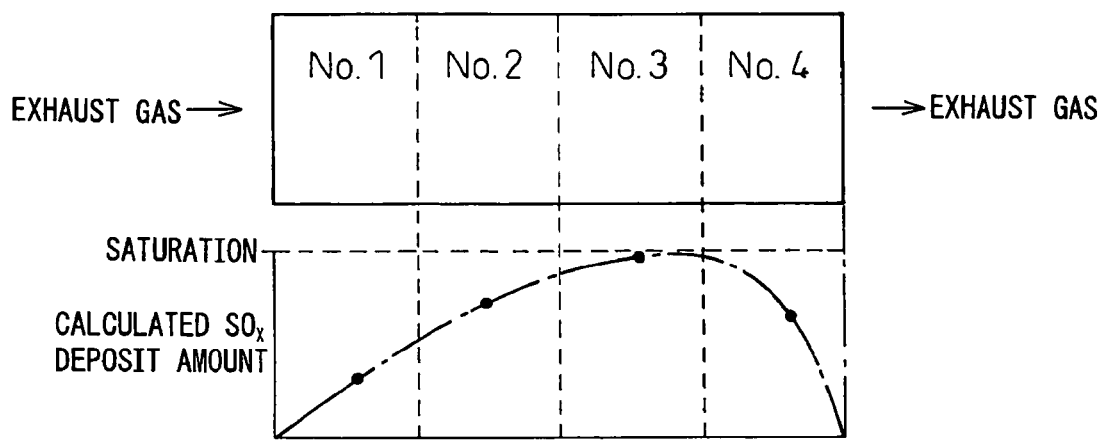
FIG. 18 is a view showing the calculated amount of $SO_x$ deposition.

The change of the $SO_x$ deposition amount $\Sigma SOst(i)$ in each catalyst region No. i during the life prolonging treatment is calculated using the relationship shown in FIGS. 17(A) and (B). An example of the calculated results when the life prolonging treatment is completed is shown in FIG. 18.

Figure 19:
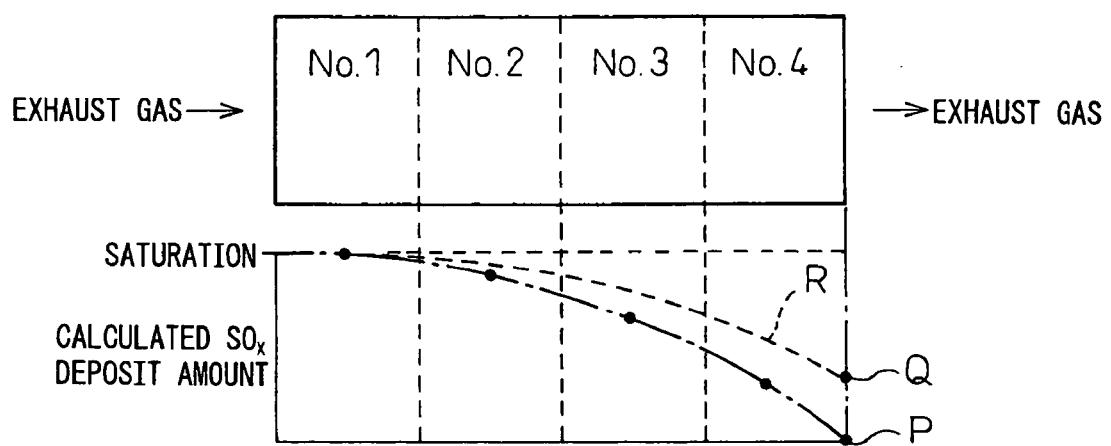
FIG. 19 is a view showing the calculated amount of $SO_x$ deposition.

FIG. 19 shows another embodiment. In this embodiment, the $SO_x$ amount SOout(j) flowing out from the $SO_x$ trap catalyst 12 is calculated, the $SO_x$ concentration in the exhaust gas flowing out from the $SO_x$ trap catalyst 12 is detected by the $SO_x$ sensor 23, and the $SO_x$ deposition amount $\Sigma SOst(i)$ in each catalyst region No. i calculated from the calculated $SO_x$ amount and the detected $SO_x$ concentration is corrected. That is, if in FIG. 19, P is the calculated exhaust $SO_x$ amount SOout(j) and Q is the exhaust $SO_x$ amount determined from the detected $SO_x$ concentration, the calculated $SO_x$ deposition amount in each catalyst region No. i is raised until the deposition change estimation curve R passing through Q.

Figure 20:
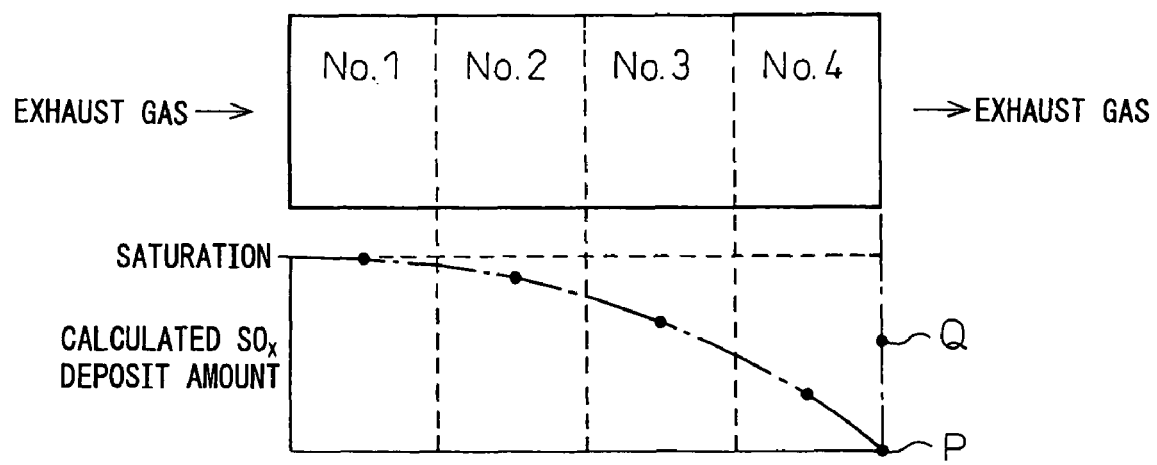
FIG. 20 is a view showing the calculated amount of $SO_x$ deposition.

FIG. 20 shows still another embodiment. In this embodiment as well, the $SO_x$ amount SOout(j) flowing out from the $SO_x$ trap catalyst 12 is calculated, the SOX concentration in the exhaust gas flowing out from the SOX trap catalyst 12 is detected by the $SO_x$ sensor 23, and the sulfur content of the used fuel is estimated from the calculated $SO_x$ amount P and the $SO_x$ amount Q determined from the detected $SO_x$ concentration. That is, when using the $NO_x$ storing catalyst 13, the use of a fuel with a high sulfur content is prohibited, but if a user accidentally uses high sulfur content fuel, in FIG. 20, as shown by Q, the detected $SO_x$ amount is higher in comparison to the calculated $SO_x$ amount P.

Therefore, in this embodiment, it is judged from the degree of the difference of the detected $SO_x$ amount Q and the calculated $SO_x$ amount P if a fuel having a sulfur content greater than the predetermined concentration is used, and if it is judged that a fuel having a sulfur content greater than the predetermined concentration is being used, a warning will be issued. For example, a warning lamp will light up.

LIST OF REFERENCE NUMERALS

4 . . . intake manifold
5 . . . exhaust manifold
7 . . . exhaust turbocharger
12 . . . SO, trap catalyst
13 . . . NO storing catalyst
14 . . . hydrocarbon feed valve

The invention claimed is:

1. An exhaust purification device of an internal combustion engine, the exhaust purification device comprising:
an $SO_x$ trap catalyst disposed in an engine exhaust passage, the $SO_x$ trap catalyst able to trap $SO_x$ contained in an exhaust gas and having a property of trapping the $SO_x$ contained in the exhaust gas when an air-fuel ratio of the exhaust gas flowing into the $SO_x$ trap catalyst is lean and having the trapped $SO_x$ gradually diffuse to an inside of the $SO_x$ trap catalyst when a temperature of the $SO_x$ trap catalyst rises under a lean air-fuel ratio of the exhaust gas; and
an electronic control unit having control logic configured to control a hydrocarbon supply valve disposed upstream of the $SO_x$ trap catalyst so that the hydrocarbon supply valve increases an amount of hydrocarbons in the exhaust gas flowing into the $SO_x$ trap catalyst by an amount that causes a locally rich region in which an air-fuel ratio locally becomes rich to be formed in an upstream side of the $SO_x$ trap catalyst, the control logic causing the amount of increase of the hydrocarbons to be set so that the $SO_x$ released from the locally rich region in the upstream side of the $SO_x$ trap catalyst is trapped in the $SO_x$ trap catalyst once again at a more downstream side of the $SO_x$ trap catalyst without flowing out from a downstream end of the $SO_x$ trap catalyst, thereby increasing an $SO_x$ trap rate of the $SO_x$ trap catalyst and prolonging a lifetime of the $SO_x$ trap catalyst,
wherein the control logic of the electronic control unit is further configured so that when the $SO_x$ trap rate again falls after prolonging the lifetime of the $SO_x$ trap catalyst, the temperature of the $SO_x$ trap catalyst is raised under the lean air-fuel ratio of the exhaust gas to thereby restore the $SO_x$ trap rate by causing the trapped $SO_x$ to gradually diffuse to the inside of the $SO_x$ trap catalyst.

2. An exhaust purification system of an internal combustion engine as claimed in claim 1, wherein the control logic of the electronic control unit is configured to calculate the $SO_x$ amount trapped in the $SO_x$ trap catalyst and prolong the lifetime of the $SO_x$ trap catalyst when the calculated $SO_x$ amount exceeds a predetermined $SO_x$ amount.

3. An exhaust purification device of an internal combustion engine as claimed in claim 1, further comprising:
an $SO_x$ sensor for detecting an $SO_x$ concentration in exhaust gas flowing out from the $SO_x$ trap catalyst, and
wherein the control logic of the electronic control unit is configured to prolong the lifetime of the $SO_x$ trap catalyst when the detected $SO_x$ concentration exceeds a predetermined concentration.

4. An exhaust purification device of an internal combustion engine as claimed in claim 1, further comprising:
an HC concentration sensor for detecting an HC concentration in exhaust gas flowing out from the $SO_x$ trap catalyst, and
wherein the control logic of the electronic control unit is configured to control the amount of the hydrocarbons in accordance with the detected HC concentration.

5. An exhaust purification device of an internal combustion engine as claimed in claim 1, wherein
the $SO_x$ trap catalyst is divided into a plurality of catalyst regions along a flow of the exhaust gas, and
the control logic of the electronic control unit is configured to calculate the $SO_x$ trapped amount of each catalyst region, and prolong the lifetime of the $SO_x$ trap catalyst when the $S_x$ trapped amount of a catalyst region positioned furthest downstream exceeds a predetermined amount.

6. An exhaust purification device of an internal combustion engine as claimed in claim 5, wherein
the control logic of the electronic control unit is configured to calculate the $SO_x$ amount flowing out from the $SO_x$ trap catalyst,
the exhaust gas purification device further comprises an $SO_x$ sensor for detecting the $SO_x$ concentration in exhaust gas flowing out from the $SO_x$ trap catalyst, and wherein the control logic of the electronic control unit is configured to correct the $SO_x$ trapped amount calculated in each catalyst region using the calculated $SO_x$ amount and the detected $SO_x$ concentration.

7. An exhaust purification device of an internal combustion engine as claimed in claim 1, wherein the control logic of the electronic control unit is configured to calculate the $SO_x$ amount flowing out from the $SO_x$ trap catalyst, the exhaust gas purification device further comprises an $SO_x$ sensor for detecting the $SO_x$ concentration in exhaust gas flowing out from the $SO_x$ trap catalyst, and the control logic of the electronic control unit is configured to judge from the calculated $SO_x$ amount and the detected $SO_x$ concentration if fuel having a sulfur content higher than a predetermined concentration is used, and cause a warning to be issued when it is judged that a fuel having a sulfur content higher than the predetermined concentration is used.

* * * * *